United States Patent
Oh

(10) Patent No.: US 9,141,588 B2
(45) Date of Patent: Sep. 22, 2015

(54) COMMUNICATION USING HANDWRITTEN INPUT

(71) Applicant: Empire Technology Development LLC, Wilmington, DE (US)

(72) Inventor: Hyun-Oh Oh, Gwachon-si (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 104 days.

(21) Appl. No.: 13/996,331

(22) PCT Filed: Jan. 28, 2013

(86) PCT No.: PCT/US2013/023457
§ 371 (c)(1),
(2) Date: Jun. 20, 2013

(87) PCT Pub. No.: WO2014/116262
PCT Pub. Date: Jul. 31, 2014

(65) Prior Publication Data
US 2014/0212007 A1    Jul. 31, 2014

(51) Int. Cl.
*G06K 9/00* (2006.01)
*G06F 17/21* (2006.01)
*G06F 3/0488* (2013.01)

(52) U.S. Cl.
CPC .......... *G06F 17/214* (2013.01); *G06F 3/04883* (2013.01); *G06K 9/00167* (2013.01)

(58) Field of Classification Search
USPC ................ 382/187, 188, 190, 209, 224, 116; 358/1.11, 1.15, 448, 452
See application file for complete search history.

(56) References Cited

U.S. PATENT DOCUMENTS

| | | | | |
|---|---|---|---|---|
| 7,023,572 B2* | 4/2006 | Tuli | | 358/1.15 |
| 7,853,863 B2* | 12/2010 | Sakai | | 715/200 |
| 7,937,445 B2* | 5/2011 | Vincent | | 709/206 |
| 8,005,729 B1* | 8/2011 | Ulm et al. | | 705/30 |
| 8,113,885 B2* | 2/2012 | Masucci et al. | | 439/620.22 |
| 8,126,976 B2* | 2/2012 | Klassen et al. | | 709/206 |
| 8,214,338 B1* | 7/2012 | Kirchhoff et al. | | 707/693 |
| 8,302,167 B2* | 10/2012 | Mennes et al. | | 726/5 |
| 8,412,645 B2* | 4/2013 | Ramaswamy et al. | | 706/12 |
| 8,447,285 B1* | 5/2013 | Bladon et al. | | 455/414.4 |

(Continued)

FOREIGN PATENT DOCUMENTS

GB    2413425 A    10/2005

OTHER PUBLICATIONS

International Search Report from International Application No. PCT/US13/023457 mailed Apr. 10, 2013.

(Continued)

*Primary Examiner* — Yosef Kassa
(74) *Attorney, Agent, or Firm* — Brundidge & Stanger, P.C.

(57) ABSTRACT

Technologies are generally described for transmitting a handwritten input. In some examples, a method performed under control of a handwriting device may include receiving a handwritten input including a first part including a text message, recognizing the text message, identifying a user of the handwritten input, determining an emotion attribute of the identified user based on the handwritten input, determining a font information regarding a font of the first part based on the emotion attribute, generating a data file including the text message and the font information and transmitting the data file to a receiving device.

22 Claims, 8 Drawing Sheets

(56) References Cited

U.S. PATENT DOCUMENTS

| | | | |
|---|---|---|---|
| 8,954,317 B1 * | 2/2015 | Fisher et al. | 704/9 |
| 2002/0149630 A1 | 10/2002 | Kitainik | |
| 2008/0175501 A1 | 7/2008 | Renshaw | |
| 2008/0280633 A1 | 11/2008 | Agiv | |
| 2011/0319105 A1 | 12/2011 | Weiner | |
| 2012/0182211 A1 | 7/2012 | Griffin | |

OTHER PUBLICATIONS

"Samsung Galaxy Note Benefits," accessed at https://web.archive.org/web/20130126185426/http://www.samsung.com/global/microsite/galaxynote/note/benefit.html?type=find, accessed on Jan. 8, 2015, pp. 1-4.

* cited by examiner

| USER A | |
|---|---|
| FONT ID | FONT |
| font. userA. happy | happy |
| font. userA. angry | angry |
| font. userA. urgent | *urgent* |
| ⋮ | ⋮ |

134

| USER B | |
|---|---|
| FONT ID | FONT |
| font. userB. happy | *happy* |
| font. userB. angry | *angry* |
| font. userB. plain | plain |
| ⋮ | ⋮ |

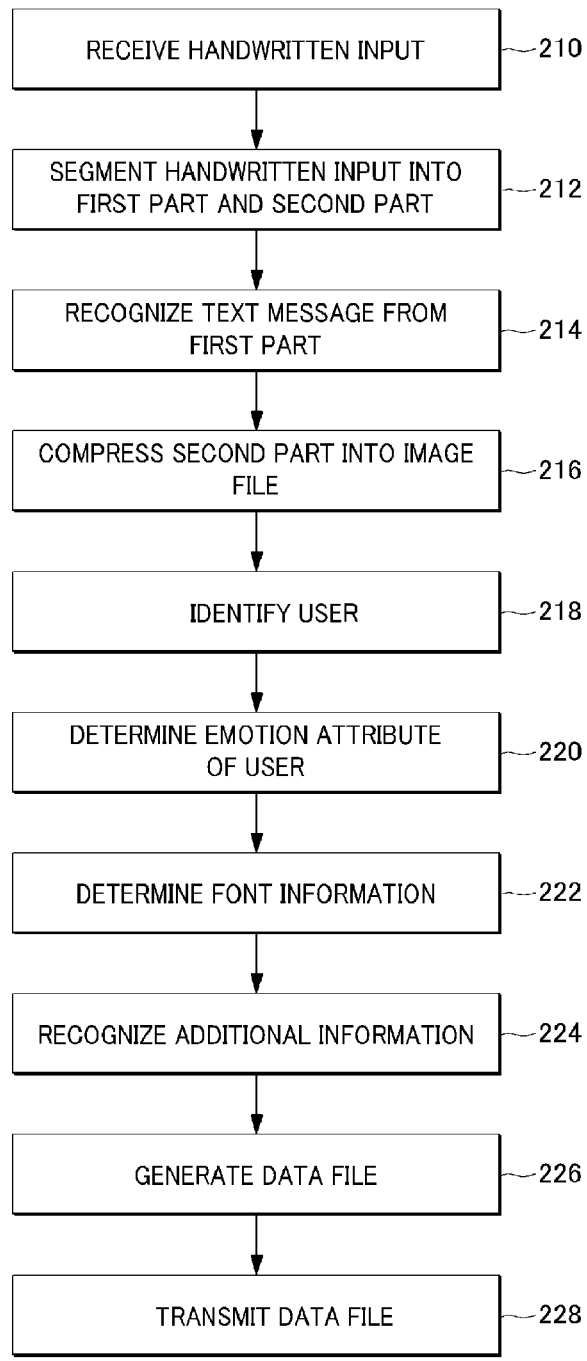

| | PLAIN | CALM SINCERE | HAPPY LOVERY | ANXIETY | EXCITED | DEPRESSED | ANGRY |
|---|---|---|---|---|---|---|---|
| WRITE SPEED | NORMAL | SLOW | SLOW | FAST | FAST | SLOW | FAST |
| WRITE PRESSURE | NEUTRAL | SOFT | STRONG →SOFT | NEUTRAL STRONG | STRONG | SOFT | STRONG →STRONG |
| FONT SIZE | NORMAL | SMALL | SMALL | LARGE | LARGE | NORMAL | LARGE |
| LANE/ SIZE ALIGNMENT | NEUTRAL | WELL | WELL | BAD | BAD | NEUTRAL | BAD |
| TYPOS | NEUTRAL | SMALL | SMALL | MANY | MANY | MANY | MANY |
| LITERAL | | WELL MADE LONG SENTENCE | "happy" "!" | "plz" "hurry" | "!" | "sad" | "mad" |
| NON- LITERAL | | | SMILE FACE heart symbol | "!!!" | underline | :-( | :-((( |
| OTHERS (schedule, place) | | MORNING | PARTY, WEEKEND | D-day | | be-fired | |
| GRIP PRESSURE | NEUTRAL | SOFT | NEUTRAL | STRONG | STRONG | SOFT | STRONG |
| BLOOD PRESSURE | MID | LOW | LOW | MID-HIGH | HIGH | LOW | HIGH |
| SWEAT | NEUTRAL | LESS | LESS | MUCH | MUCH | LESS | MUCH |
| TEMPERATURE | NEUTRAL | NEUTRAL | NEUTRAL | HIGH | HIGH | NEUTRAL | HIGH |
| FACIAL RECOGNITION | NORMAL | NORMAL | SMILE | NORMAL | EXCITED | DEPRESSED | ANGRY |
| VOICE | NEUTRAL | SOFT | DYNAMIC | HIGH, FAST | HIGH, FAST | SOFT, SLOW | HIGH, FAST |

COMMUNICATION USING HANDWRITTEN INPUT

CROSS-REFERENCE TO RELATED APPLICATION

This Application is the National Stage filing under 35 U.S.C. §371 of PCT Application Ser. No. PCT/US13/23457 filed on Jan. 28, 2013. The disclosure of the PCT Application is hereby incorporated herein by reference in its entirety.

BACKGROUND

As touch-based electronic devices are being more widely used, interest in creating, storing and transmitting handwritten notes is increasing. When transmitting a handwritten note, the handwritten note may be stored on one device as an image file that includes a sizeable amount of data, from which the image file may be transmitted to another device. In such cases, the handwritten note can be transmitted, though transmission thereof may require significant bandwidth. A receiving party may recognize an author of the handwritten note and even the emotional state of the author just from the handwritten note. In other cases, a text message may be extracted from a handwritten note and may be further stored as a text file on a device, which is of a much small data size (i.e., as a plain text), from which the text file may be transmitted to another device. In these cases, bandwidth requirements for such a file transmission may be relatively smaller, but the receiving party receives a plain text only.

SUMMARY

In an example, a method performed under control of a handwriting input device may include: receiving a handwriting input including a first part including a text message, recognizing the text message from the first part, identifying a user of the handwriting input, determining an emotion attribute of the identified user based at least in part on the handwriting input, determining a font information regarding a font of the first part based at least in part on the emotion attribute, and generating a data file including the text message and the font information. The font of the first part may be selected from multiple fonts for the identified user.

In another example, a method performed under control of a receiving device may include: receiving a data file including a text message of a first part of a handwriting input and a font information regarding a font of the first part from a handwriting input device, selecting the font of the first part based at least in part on the font information, and generating the first part based at least in part on the text message and the font of the first part. The font information may be based at least in part on an emotion attribute of the user of the handwriting input device, and the font of the first part may be selected from multiple fonts for a user of the handwriting input device.

In yet another example, a handwriting input device may include: a receiving unit configured to receive a handwriting input including a first part including a text message, a text message recognition unit configured to recognize the text message from the first part, a user identification unit configured to identify a user of the handwriting input, an emotion attribute determination unit configured to determine an emotion attribute of the identified user based at least in part on the handwriting input, a font information determination unit configured to determine a font information regarding a font of the first part based at least in part on the emotion attribute, and a data file generation unit configured to generate a data file including the text message and the font information. The font of the first part may be selected from multiple fonts for the identified user.

In yet another example, a computer-readable storage medium may store thereon computer-executable instructions that, in response to execution, cause a handwriting input device to perform operations including receiving a handwriting input including a first part including a text message, recognizing the text message from the first part, identifying a user of the handwriting input, determining an emotion attribute of the identified user based at least in part on the handwriting input, determining a font information regarding a font of the first part based at least in part on the emotion attribute, generating a data file including the text message and the font information, and transmitting the data file to a receiving device via a network. The font of the first part may be selected from multiple fonts for the identified user.

In yet another example, a computer-readable storage medium may store thereon computer-executable instructions that, in response to execution, cause a receiving device to perform operations including receiving a data file including a text message of a first part included in a handwriting input and a font information regarding a font of the first part from a handwriting input device, determining the font from the first part based at least in part on the font information, and generating the first part based at least in part on the text message and the font of the first part. The font information may be based at least in part on an emotion attribute of the user of the handwriting input device, and the font of the first part may be selected from multiple fonts for a user of the handwriting input device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

FIG. 1B schematically shows an illustrative example of individual font databases stored in a font database, arranged in accordance with at least some embodiments described herein;

FIG. 2 shows an example flow diagram of a process for a handwriting input device transmitting a handwriting input to a receiving device, arranged in accordance with at least some embodiments described herein;

FIG. 3 schematically shows an illustrative example of an emotion attribute table, arranged in accordance with at least some embodiments described herein;

DETAILED DESCRIPTION

Figure 1A:
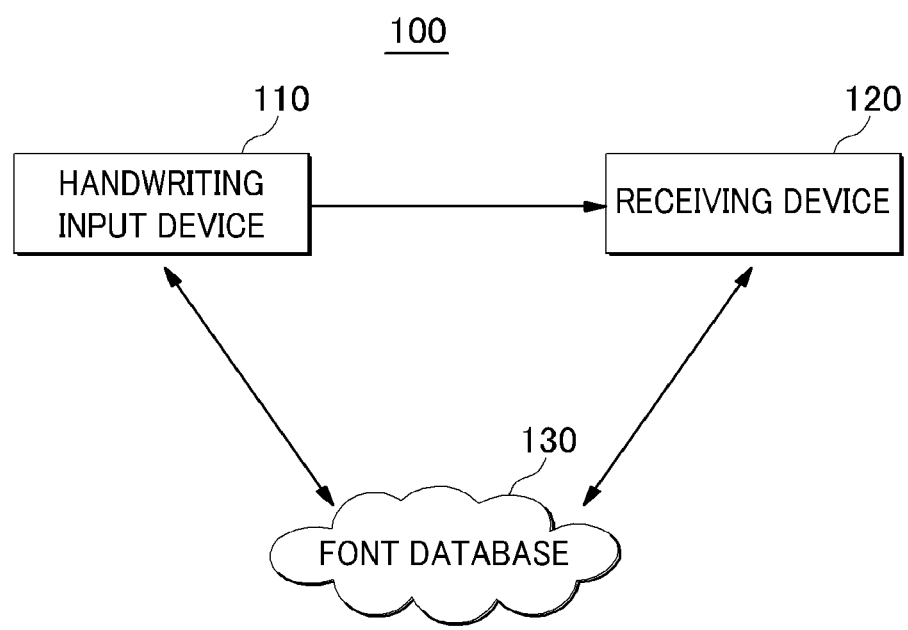
FIG. 1A schematically shows an illustrative example of a communications environment including a handwriting input device, a receiving device and a font database, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter cilia, to methods, apparatuses, systems, devices, and computer program products related to communication schemes using a handwriting input including at least one of a text message and an image. Technologies are generally described for transmitting a handwriting input from a handwriting input device to a receiving device while maintaining an individual font of a user of the handwriting input.

In some examples, a handwriting input device may receive a handwritten input that includes a first part including a text message and a second part including an image. The handwriting input device may segment the handwritten input into the first part and the second part. The handwriting input device may compress the second part that includes the image into an image file and recognize the text message from the first part using a conventional text recognition method. Further, the handwriting input device may utilize at least the handwritten input to determine an emotion attribute of an author or originator of the handwritten input. By way of examples, but not limitation, the handwriting input device may determine the emotion attribute based on contents of the text message, a size of the first part of the handwritten input, apparent speed at which the handwritten input is input to the device, apparent physical pressure applied to the device while the handwritten input is input to the device, line alignment of the first part of the handwritten input, consistency in size of letters and/or characters in the first part of the handwritten input, a number of spelling errors included in the first part, one or more emoticons included in the first part of the handwritten input, and/or one or more symbol characters included in the first part of the handwritten input. Then, the handwriting input device may determine font information regarding a font of the first part based on the emotion attribute of the user. The font information may include an identifier (i.e., a font ID) for each font of one or more fonts of the author or originator of the handwritten input. The font corresponding to the font information may be stored in an individual font database of the user, which may be stored in a cloud database center which may store multiple individual font databases for respective users. The cloud database center may be hosted or serviced by a service provider, which may also provide an application for use in the handwriting input device and/or a receiving device that receives the handwritten input from the handwriting input device. The handwriting input device and/or the receiving device may access the cloud database center using the application for retrieving, storing and/or updating the fonts of the individual font databases. Further, the handwriting input device may have an individual secret key or a password and access to the individual font database stored in the cloud database center using the individual secret key or the password.

The handwriting input device may generate a data file, including the compressed image file, the text message and the font information, and transmit the data file (together with the individual secret key or the password necessary for accessing to the individual font database) to a receiving device. The receiving device may decompress the compressed image file into the original image using a conventional image file decompressing method and also recognize the text message. Further, the receiving device may select the font corresponding to the font information from multiple individual fonts which are stored in the individual font database. By way of examples, but not limitation, the receiving device may access to the individual font database stored in the cloud database center by inputting the individual secret key or the password. Then, the receiving device may apply the font to the text message, so that the text included in the handwritten input can be restored. Further, the receiving device may combine the original image and the restored text to restore the original handwritten input.

FIG. 1A schematically shows an illustrative example of a communications environment 100 including a handwriting input device 110, a receiving device 120 and a font database 130, arranged in accordance with at least some embodiments described herein. In accordance with at least one example embodiment, handwriting input device 110 may receive a handwritten input from a user. By way of examples, but not limitation, handwriting input device 110 may include a tablet computer, a tablet device or a smartphone having a touch screen such as a capacitive touch screen or a resistive touch screen. The handwritten input may include a first part including a text message and a second part including an image.

Handwriting input device 110 may recognize the text message from the first part of the handwritten input using a conventional text recognition method. In some embodiments, handwriting input device 110 may extract the text message from the first part and save the extracted text message as a text file with a file name of, for example, "note.txt." Further, handwriting input device 110 may compress the second part of the handwritten input into an image file. In some embodiments, handwriting input device 110 may compress the image included in the second part into an image file with a file name of, for example, "figure.jpg."

Handwriting input device 110 may identify the user of the handwritten input based on, e.g., at least a font of the handwritten input, a device identifier, or log-in information regarding handwriting input device 110. The device identifier may include, but is not limited to, a MAC address or an IP address of handwriting input device 110.

Further, handwriting input device 110 may determine font information regarding a font utilized for the first part of the handwritten input. The font information may include information of the identified user and his/her font ID, and the font ID may correspond to an emotion attribute of the identified user and will be described more in detail with reference to FIG. 1B below. In some embodiments, in order to determine the font information, handwriting input device 110 may determine the emotion attribute of the identified user based at least in part on the handwritten input. By way of examples, but not limitation, the emotion attribute may include a calm state, a happy state, an urgent state, an excited state, a depressed state or an angry state. In some embodiments, handwriting input device 110 may determine the emotion attribute based at least in part on at least one of contents of the text message, a size of the first part of the handwritten input, text writing speed of the user, text writing pressure of the user, line alignment of the first part of the handwritten input, consistency in size of letters and/or characters in the first part of the handwritten input, a number of spelling errors included in the first part, one or more emoticons included in the first part of the handwritten input, and/or one or more symbol characters included in the first part of the handwritten input.

By way of examples, but not limitation, if the size of letters and/or characters in the first part of the handwritten input is relatively large compared to the touch screen of handwriting input device 110, handwriting input device 110 may determine that the emotion attribute of the identified user is, e.g., an excited state. Further, handwriting input device 110 may determine the apparent text input speed of the user based on a writing time and the number of letters and/or characters in the first part. When the text writing speed is faster than a predetermined speed, handwriting input device 110 may determine that the emotion attribute of the identified user is, e.g., one of urgency.

Font database 130 may store one or more individual font databases for respective users, and each of the individual font databases may include one or more fonts for each user. Examples of the individual font databases will be shown below with reference FIG. 1B. In some embodiments, font database 130 may include a cloud data center. By way of examples, but not limitation, font database 130 may be the cloud data center to which handwriting input device 110 and receiving device 120 may access for retrieving, storing and/or updating the fonts of the individual font databases. Fonts included in each of the individual font databases stored in font database 130 may be used as a match-up token of each user, so one may find users who have similar fonts easily. Handwriting input device 110 may access to font database 130 and look for a font that corresponds to the emotion attribute of the user and determine the font information regarding the font of the first part. When the font of the first part is a new font, handwriting input device 110 may store the font of the first part (which does not exist in font database 130) and font information thereof in font database 130 and update font database 130. Further, receiving device 120 may access font database 130 using a secret key or a password (which may have been provided by handwriting input device 110) and select a font based on the font information from one or more of the user's fonts which are stored in font database 130.

FIG. 1B schematically shows an illustrative example of individual font databases stored in font database 130, arranged in accordance with at least some embodiments described herein. As illustrated in FIG. 1B, there may be multiple individual font databases 132 and 134 stored in font database 130. Font database 132 may include one or more fonts 132a for a user A and corresponding font information (i.e. FONT ID 132b in FIG. 1B) corresponding to each font for the user A; and, font database 134 may include one or more fonts 134a for a user B and corresponding font information (i.e. FONT ID 134b in FIG. 1B) corresponding to each font for the user B. Fonts 132a and 134a included in individual font databases 132 and 134 may be determined based on unique handwriting characteristics of the user A and the user B, respectively, and the fonts of the user A and those of the user B may be different. Font database 130 may be formed and updated by a process of handwriting input device 110 collecting unique handwriting characters of the user. If the user of the handwritten input is a first time user, font database 130 may create a new individual font database for the first time user and store his/her font and font information thereof in the new individual font database.

By way of example, but not limitation, FIG. 1B shows that the font corresponding to an angry state for the user A (i.e., the font id of "font.userA.angry" 133b) may be bold, while the font corresponding to the angry state for the user B (i.e., the font id of "font.userB.angry" 135b) may be italicized. The difference in fonts for a common emotion attribute between two different users may be due to, e.g., the user A applying significant pressure to the input device when writing in an angered state and the user B writing rapidly when writing in an angered state.

Referring back to FIG. 1A, handwriting input device 110 may determine the font information regarding the font of the first part of the handwritten input with reference to the individual font databases stored in font database 130 based at least in part on the emotion attribute of the user. By way of example, but not limitation, when the identified user of the handwritten input is the user A and the determined emotion attribute of the user A is a happy state, handwriting input device 110 may look for a font that corresponds to the happy state with reference to individual font database 132 of the user A and determine the font information regarding the font of the first part as the font id of "font.userA.happy" 133a as shown in FIG. 1B in order to provide the determined font information to receiving device 120.

Handwriting input device 110 may generate a data file including the recognized text message, the image file and the font information. In some embodiments, handwriting input device 110 may combine and pack the text file, the image file and the font information into a single data file or a bitstream. Further, handwriting input device 110 may transmit the data file or the bitstream to receiving device 120 via a network. By way of examples, but not limitation, the network may include a wired network, a wireless local area network, a Wibro network or a Bluetooth network.

Receiving device 120 may receive the data file from handwriting input device 110 via a network. By way of example, but not limitation, the network may include a wired network, a wireless local area network, a Wibro network or a Bluetooth network. Receiving device 120 may segment the data file into the text message, the image file and the font information. Receiving device 120 may select a font based on the font information from one or more of the user's fonts which are stored in font database 130. Receiving device 120 may access font database 130 using, e.g., a secret key or a password. In some embodiments, handwriting input device 110 may provide receiving device 120 with the secret key or the password, which is necessary to access to the individual font database of the user of handwriting input device 110.

Receiving device 120 may generate the first part of the original handwritten input by applying the selected font to the text message. By way of example, but not limitation, receiving device 120 may combine a plain text message (which does not have a font) of the first part and the selected font, so that the first part having the font may be generated. Further, receiving device 120 may restore the second part of the original handwritten input from the image file by decompressing the image file and then, combine the generated first part and the restored second part to regenerate the original handwritten input having the first part and the second part. Accordingly, receiving device 120 may restore the same handwritten input as the original handwritten input of the user. With reference to FIGS. 1A and 1B, although the handwritten input includes the first part and the second part, in some embodiments, the handwritten input may include only the first part including a text message. In that case, processes of handwriting input device 110 and receiving device 120 regarding the second part and the combining process by receiving device 120 may be omitted.

In some embodiments, the individual font databases stored in font database 130 may be sold in user font marketplaces. By way of example, but not limitation, some people may want to use other's fonts which are unique and/or beautiful, and such people may want to get the other's fonts even paying money. In such cases, one, who has an individual font database stored in font database 130, may allow other people to use his/her fonts therein with or without charging.

In some embodiments, handwriting input device 110 may work with or include a speech-to-text system to generate a text message with speaker's emotion attribute. Specifically, the speech-to-text system may include a speech-to-text engine that converts a voice of a speaker into a text message and a context-aware engine that obtains emotion attribute of the speaker. In such cases, handwriting input device 110 may identify the speaker, the text message corresponding to his/her voice and his/her emotion attribute and determine the font information from font database 130. The text message and the font information may then be transmitted to receiving device 120 for reproduction.

FIG. 2 shows an example flow diagram of a process 200 of handwriting input device 110 for transmitting a handwriting input to receiving device 120, arranged in accordance with at least some embodiments described herein. The method in FIG. 2 may be implemented in communications environment 100 including handwriting input device 110, receiving device 120 and font database 130, as illustrated in FIG. 1A. An example process may include one or more operations, actions, or functions as illustrated by one or more blocks 210, 212, 214, 216, 218, 220, 222, 224, 226 and/or 228. Although illustrated as discrete blocks, various blocks may be divided into additional blocks, combined into fewer blocks, or eliminated, depending on the desired implementation. Processing may begin at block 210.

At block 210 (Receive Handwritten Input), handwriting input device 110 may receive a handwritten input which includes a first part including a text message and a second part including an image. Although the handwritten input is described to include all of the first part and the second part, in some embodiments, the handwritten input may include only the first part including a text message. Processing may proceed from block 210 to block 212.

At block 212 (Segment Handwritten Input into First part and Second part), handwriting input device 110 may segment the handwritten input into the first part and the second part. In some embodiments, if the handwritten input does not include the second part including the image, segmentation of the handwritten input may be omitted. Processing may proceed from block 212 to block 214.

At block 214 (Recognize Text Message from First part), handwriting input device 110 may recognize the text message from the first part of the handwritten input using a conventional text recognition method. By way of example, but not limitation, handwriting input device 110 may extract the text message from the first part of the handwritten input and save the extracted text message as a text file with a file name of, for example, "note.txt." Processing may proceed from block 214 to block 216.

At block 216 (Compress Second part into Image file), handwriting input device 110 may compress the second part of the handwritten input into an image file. By way of example, but not limitation, handwriting input device 110 may compress the second part into an image file with a file name of, for example, "figure.jpg." In some embodiments, if the handwritten input does not include the second part including the image, compression of the second part may be omitted. Processing may proceed from block 216 to block 218.

At block 218 (Identify User), handwriting input device 110 may identify a user of the handwritten input. In some embodiment, handwriting input device 110 may identify the user based at least in part on a device identifier or log-in information regarding the handwriting input device 110. The device identifier may include, but not limited thereto, a MAC address or an IP address of handwriting input device 110. In some other embodiments, handwriting input device 110 may recognize a font of the handwritten input and identify the user associating the recognized font with the user. Processing may proceed from block 218 to block 220.

At block 220 (Determine Emotion Attribute), handwriting input device 110 may determine an emotion attribute of the identified user based at least in part on the handwritten input. By way of examples, but not limitation, the emotion attribute may include a calm state, a happy state, an urgent state, an excited state, a depressed state, an angry state. In some embodiments, handwriting input device 110 may determine the emotion attribute based on various factors including contents of the text message, a size of the first part of the handwritten input, text writing speed of the user, pressure applied by the user when rendering the handwritten input, line alignment of the first part of the handwritten input, size regularity of the first part of the handwritten input, a number of spelling errors included in the first part, one or more emoticons included in the first part of the handwritten input, and/or one or more symbols included in the first part of the handwritten input. Examples regarding how to determine the emotion attribute based on those factors are described with reference to FIG. 3 below.

FIG. 3 schematically shows an illustrative example of an emotion attribute table 300, arranged in accordance with at least some embodiments described herein. In some embodiments, handwriting input device 110 may measure an average writing speed based on writing time and the number of letters and/or characters in the first part and average writing pressure of the user using a pressure sensor associated with a touch screen or a touch pen of handwriting input device 110. If the average writing speed is faster than a predetermined speed which may be stored on handwriting input device 110 and the writing pressure is stronger than a predetermined pressure which may be stored on handwriting input device 110, as illustrated in FIG. 3, handwriting input 110 may determine the emotion attribute of the user as the excited state. This may be because generally a person may write in high writing speed and in strong writing pressure when he/she is excited.

In another example embodiment, if a font size of the handwritten input is smaller than a predetermined font size which is stored on handwriting input device 110 and the number of spelling errors included in the handwritten input is smaller than a predetermined error number which is stored on handwriting input device 110, as illustrated in FIG. 3, handwriting input 110 may determine the emotion attribute of the user as the happy state. Further, in some other embodiments, if terms that may be associated with an urgent context, e.g., "hurry," is included in the handwritten input, as illustrated in FIG. 3, handwriting input device 110 may determine the emotion attribute of the user as one of anxiety.

Further, handwriting input device 110 may consider at least one of a time data, a schedule of the user or a place where the user is to determine the emotion attribute. The time data may be gathered from a clock or a timer included in handwriting input device 110, and handwriting input device 110 may determine information regarding the place where the user is based on the schedule of the user, which is stored on handwriting input device 110. By way of examples, but not limitation, if in the morning the user makes the handwritten input, as illustrated in FIG. 3, handwriting input 110 may determine the emotion attribute of the user as one of calm and/or serenity. This may be because generally a person may be calm and write in the calm state in the morning.

Furthermore, handwriting input device 110 may consider at least one of a grip pressure of the user, a blood pressure of the user, a sweat amount of the user, a temperature of a place where the user is, a facial recognition data of the user or a voice data of the user to determine the emotion attribute. By way of example, but not limitation, handwriting input device 110 may include a temperature sensor, a humidity sensor, a camera, a microphone or pen/stylus having a grip pressure sensor and blood pressure sensor, a temperature sensor, a humidity sensor, a camera and a microphone. By way of examples, but not limitation, handwriting input device 110 may measure a grip pressure of the user and a blood pressure of the user using the microphone or pen/stylus having the grip pressure sensor and blood pressure sensor. If the grip pressure is stronger than a predetermined grip pressure value which is stored on handwriting input device 110 and the blood pressure is higher than a predetermined blood pressure value which is stored on handwriting input device 110, as illustrated in FIG. 3, handwriting input 110 may determine the emotion attribute of the user as the angry state. Processing may proceed from block 220 to block 222.

Referring back to FIG. 2, at block 222 (Determine Font Information), handwriting input device 110 may determine font information regarding a font of the first part of the handwritten input based at least in part on the emotion attribute which is determined at block 220. In some embodiments, multiple fonts for the identified user and font information corresponding to the multiple fonts may be stored in font database 130 as illustrated in FIG. 1B. Handwriting input device 110 may select a font corresponding to the first part of the handwritten input from the multiple fonts based at least in part on the emotion attribute and determine the font information corresponding to the selected font.

If the font and font information regarding the font of the first part of the handwritten input are stored in font database 130, handwriting input device 110 may select the font and the corresponding font information. However, if there is no corresponding font for the font of the first part of the handwritten input found in font database 130, handwriting input device 110 may select a font from font database 130, which is the most similar to the font of the first part and determine the font information regarding the font of the first part as the font information of the most similar font from font database 130. Thereafter, handwriting input device 110 may store the font of the first part (which does not exist in font database 130) and the font information thereof in font database 130 and update font database 130. Processing may proceed from block 222 to block 224.

At block 224 (Recognize Additional Information), handwriting input device 110 may recognize additional information regarding the first part of the handwritten input. In some embodiments, the additional information may include at least one of a size of the first part of the handwritten input, a color of the first part, or a font thickness of the first part. Processing may proceed from block 224 to block 226.

At block 226 (Generate Data File), handwriting input device 110 may generate a data file including the recognized text message, the image file, the font information and the additional information. In some embodiments, handwriting input device 110 may combine and pack the text file, the image file, the font information and the additional information into a single data file or a bitstream. Processing may proceed from block 226 to block 228.

At block 228 (Transmit Data File), handwriting input device 110 may transmit the data file or the bitstream to receiving device 120 via a network. By way of examples, but not limitation, the network may include a wired network, a wireless local area network, a Wibro network or a Bluetooth network.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
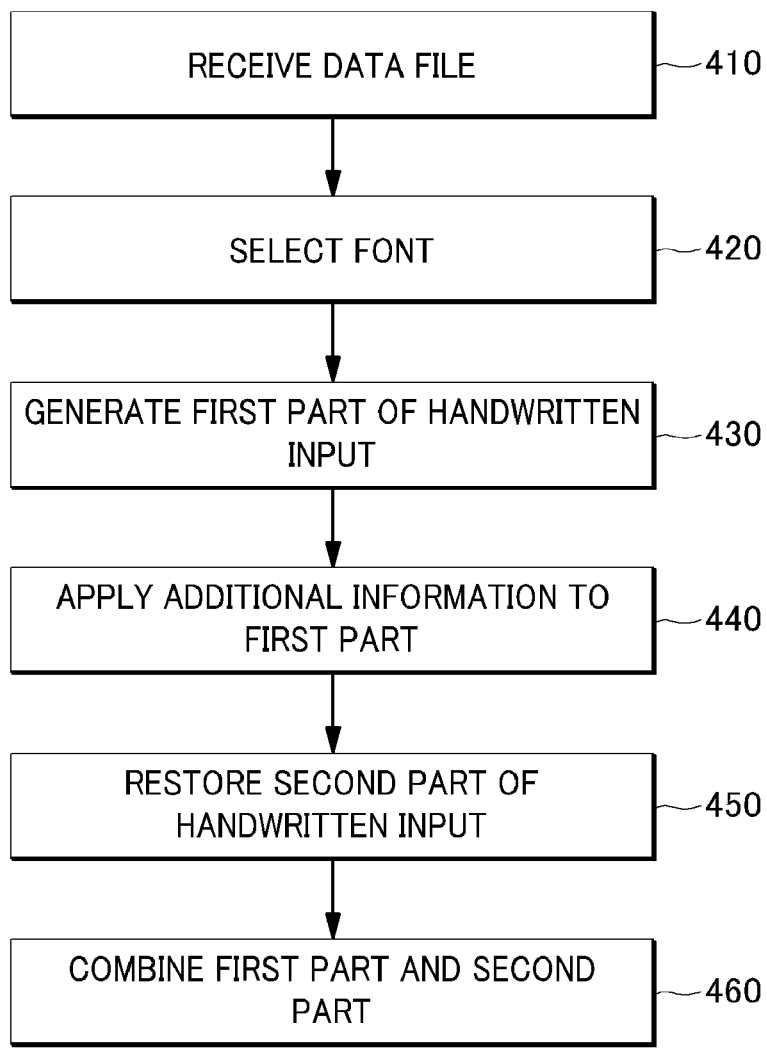
FIG. 4 shows an example flow diagram of a process of a receiving device for receiving a handwriting input from handwriting input device, arranged in accordance with at least some embodiments described herein.

FIG. 4 shows an example flow diagram of a process 400 of a receiving device 120 for receiving a handwritten input from handwriting input device 110, arranged in accordance with at least some embodiments described herein. The method in FIG. 4 may be implemented in communications environment 100 including handwriting input device 110, receiving device 120 and font database 130, as illustrated in FIG. 1A. An example process may include one or more operations, actions, or functions as illustrated by one or more blocks 410, 420, 430, 440, 450 and/or 460. Although illustrated as discrete blocks, various blocks may be divided into additional blocks, combined into fewer blocks, or eliminated, depending on the desired implementation. Processing may begin at block 410.

At block 410 (Receive Data File), receiving device 120 may receive a data file that includes a text message, an image file, font information regarding a font of a handwritten input and additional information regarding the handwritten information from handwriting input device 110. In some embodiments, the handwritten input may include a first part including the text message and a second part that includes an image. The font information is determined by handwriting input device 110 based at least in part on an emotion attribute of a user of handwriting input device 110 as described in FIGS. 2-3. The additional information may include at least one of a size of the first part, a color of the first part, or a font thickness of the first part. Further, at block 410, receiving device 120 may segment the data file into the text message, the image file, the font information and the additional information. Processing may proceed from block 410 to block 420.

At block 420 (Select Font), receiving device 120 may select the font of the first part of the handwritten input based at least in part on the font information. Multiple fonts of a user of handwriting input device 110 and the font information corresponding to the fonts may be stored in font database 130. In some embodiments, font database 130 may include a cloud data center or may be stored in the cloud data center. Receiving device 120 may access to font database 130 using, e.g., a secret key or a password. In some embodiments, handwriting input device 110 may provide receiving device 120 with the secret key or the password that is necessary to access to font database 130. Processing may proceed from block 420 to block 430.

At block 430 (Generate First Part of Handwritten Input), receiving device 120 may generate the first part of the handwritten input based at least in part on the text message and the font that is selected at block 420. In some embodiments, receiving device 120 may apply the selected font to the plain text message, so that the first part including the text message of the handwritten input may be generated. Processing may proceed from block 430 to block 440.

At block 440 (Apply Additional Information), receiving device 120 may apply the additional information to the first part which is generated at block 430. Accordingly, the original first part of the handwritten input may be restored. Processing may proceed from block 440 to block 450.

At block 450 (Restore Second Part of Handwritten Input), receiving device 120 may restore the second part of the handwritten input. In some embodiments, receiving device 120 may decompress the image file into the original image which is included in the second part, so that the original second part of the handwritten input may be restored. In some other embodiments, if the handwritten input includes only the first part, the process of block 450 may be omitted. Processing may proceed from block 450 to block 460.

At block 460 (Combine First Part and Second Part), receiving device 120 may combine the first part of the handwritten input, which is restored at block 440, and the second part of the handwritten input, which is restored at block 450. Accordingly, receiving device 120 may generate the same handwritten input as the original handwritten input which is generated by the user of handwriting input device 110.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
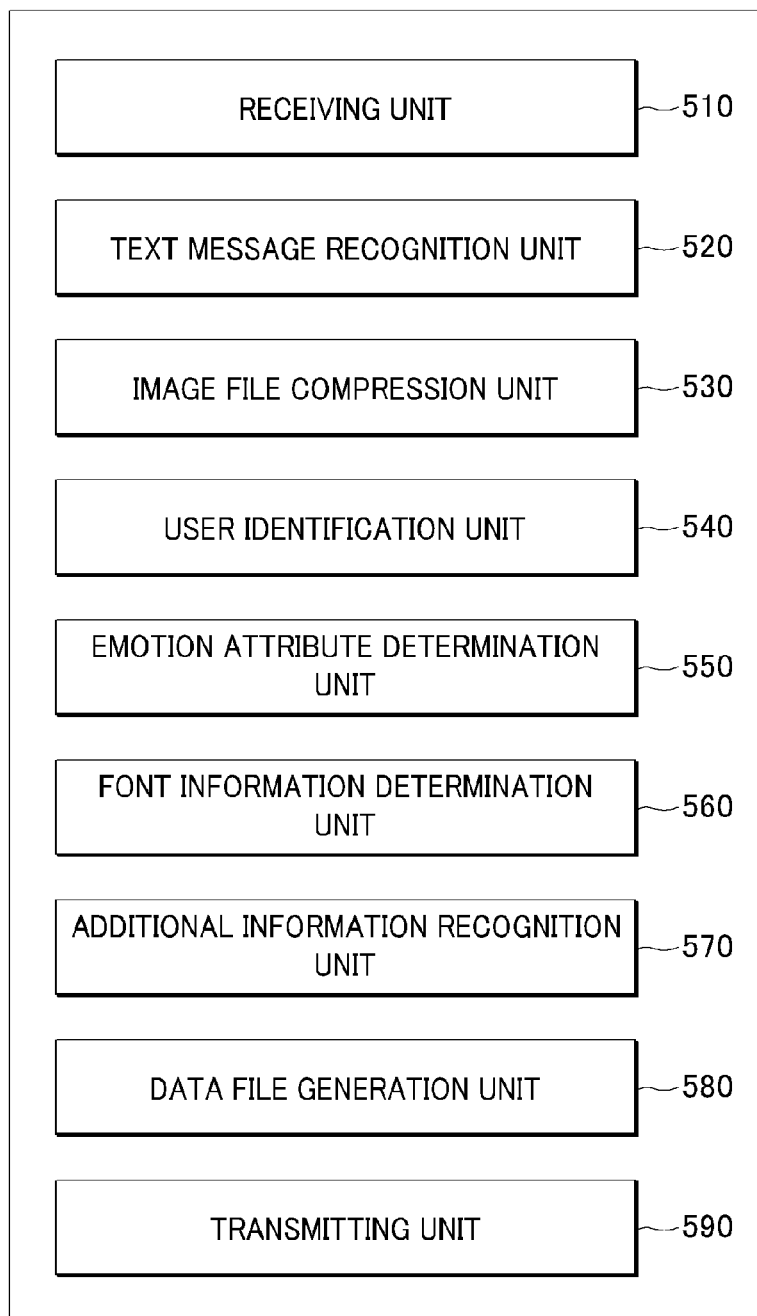
FIG. 5 shows a schematic block diagram illustrating an example architecture for a handwriting input device, arranged in accordance with at least some embodiments described herein.

FIG. 5 shows a schematic block diagram illustrating an example architecture for a handwriting input device 110, arranged in accordance with at least some embodiments described herein. As depicted in FIG. 5, handwriting input device 110 may include a receiving unit 510, a text message recognition unit 520, an image file compression unit 530, a user identification unit 540, an emotion attribute determination unit 550, a font information determination unit 560, an additional information recognition unit 570, a data file generation unit 580, and a transmitting unit 590. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of receiving unit 510, text message recognition unit 520, image file compression unit 530, user identification unit 540, emotion attribute determination unit 550, font information determination unit 560, an additional information recognition unit 570, data file generation unit 580, and transmitting unit 590 may be included in an instance of an application hosted on handwriting input device 110.

Receiving unit 510 may be configured to receive a handwritten input that includes a first part including a text message and a second part that includes an image from a user. Although the handwritten input is described to include all of the first part and the second part, in some embodiments, the handwritten input may include only the first part including the text message. Further, receiving unit 510 may segment the handwritten input into the first part and the second part.

Text message recognition unit 520 may be configured to recognize the text message from the first part of the handwritten input. Text message recognition unit 520 may recognize the text message using a conventional text recognition method.

Image file compression unit 530 may be configured to compress the second part into an image file. In some embodiments, image file compression unit 530 may compress the image included in the second part into an image file using a conventional image compressing method.

User identification unit 540 may be configured to identify the user of the handwritten input. In some embodiments, user identification unit 540 may identify the user based at least in part on a device identifier and/or log-in information regarding the handwriting input device 110. The device identifier may include, but is not limited thereto, a MAC address or an IP address of handwriting input device 110.

Emotion attribute determination unit 550 may be configured to determine an emotion attribute of the identified user based at least in part on the handwritten input. In some embodiments, emotion attribute determination unit 550 may determine the emotion attribute based at least in part on at least one of contents of the text message, a size of the first part of the handwritten input, text writing speed of the user, text writing pressure of the user, line alignment of the first part, size regularity of the first part, a number of spelling errors included in the first part, an emoticon included in the first part, one or more symbols included in the first part of the handwritten input, a time data, a schedule of the user, a place where the user is, a grip pressure of the user, a blood pressure of the user, a sweat amount of the user, a temperature of a place where the user is, a facial recognition data of the user or a voice data.

Font information determination unit 560 may be configured to determine font information regarding a font of the first part of the handwritten input based at least in part on the determined emotion attribute. In some embodiments, multiple fonts for the identified user and corresponding font information may be stored in font database 130. Font information determination unit 560 may search for the font of the first part of the handwritten input from the multiple fonts corresponding to the identified user, which are stored in font database 130 based at least in part on the emotion attribute and determine the font information corresponding to the font of the first part.

Additional information recognition unit 570 may be configured to recognize additional information including at least one of a size of the first part of the handwritten input, a color of the first part, or a font thickness of the first part. For example, additional information recognition unit 570 may recognize the size of the first part of the handwritten input by comparing a size of characters of the first part and that of sample characters which are stored on handwriting input device 110. Further, additional information recognition unit 570 may recognize the color of the first part of the handwritten input using a conventional color recognition method.

Data file generation unit 580 may be configured to generate a data file including the text message, the image file, the font information and the additional information. In some embodiments, data file generation unit 580 may combine and pack the text message, the image file, the font information and the additional information into a single data file or a bitstream.

Transmitting unit 590 may be configured to transmit the data file or the bitstream including the text message, the image file, the font information and the additional information to receiving device 120 via a network.

Figure 6:
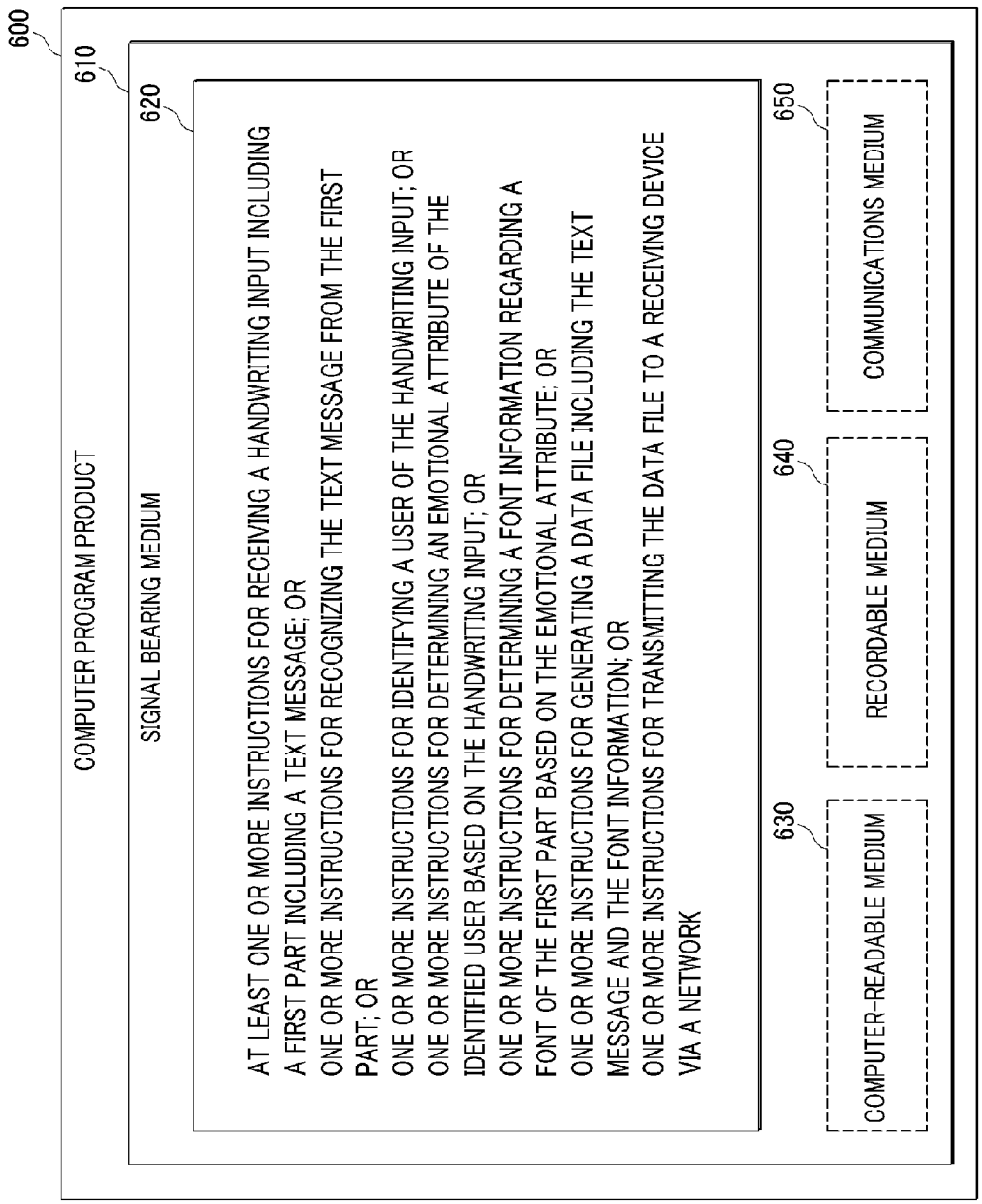
FIG. 6 illustrates computer program products that may be utilized to provide a scheme for communication using handwriting input, arranged in accordance with at least some embodiments described herein.

FIG. 6 illustrates computer program products that may be utilized to provide a scheme for communication using handwritten input, arranged in accordance with at least some embodiments described herein. Program product 600 may include a signal bearing medium 610. Signal bearing medium 610 may include one or more instructions 620 that, when executed by, for example, a processor, may provide the functionality described above with respect to FIGS. 1A-5. By way of example, but not limitation, instructions 620 may include: one or more instructions for receiving a handwritten input including a first part including a text message; one or more instructions for recognizing the text message from the first part; one or more instructions for identifying a user of the handwritten input; one or more instructions for determining an emotion attribute of the identified user based, at least in part, on the handwritten input; one or more instructions for determining a font information regarding a font of the first part based, at least in part, on the emotion attribute; one or more instructions for generating a data file including the text message and the font information; and one or more instructions for transmitting the data file to a receiving device via a network. Thus, for example, referring to FIG. 2, handwriting input device 110 may undertake one or more of the blocks shown in FIG. 2 in response to instructions 620.

By way of example, but not limitation, instructions 620 may include: one or more instructions for receiving, from a handwriting input device, a data file including a text message of a first part included in a handwritten input and a font information regarding a font of the first part; one or more instructions for determining the font from the first part based, at least in part, on the font information; and one or more instructions for generating the first part based, at least in part, on the text message and the font of the first part. Thus, for example, referring to FIG. 4, receiving device 120 may undertake one or more of the blocks shown in FIG. 4 in response to instructions 620.

In some implementations, signal bearing medium 610 may encompass a computer-readable medium 630, such as, but not limited to, a hard disk drive, a CD, a DVD, a digital tape, memory, etc. In some implementations, signal bearing medium 610 may encompass a recordable medium 640, such as, but not limited to, memory, read/write (R/W) CDs, R/W DVDs, etc. In some implementations, signal bearing medium 610 may encompass a communications medium 650, such as, but not limited to, a digital and/or an analog communication medium (e.g., a fiber optic cable, a waveguide, a wired communications link, a wireless communication link, etc.). Thus, for example, program product 600 may be conveyed to one or more modules of sender device 120 by an RF signal bearing medium 620, where the signal bearing medium 620 is conveyed by a wireless communications medium 650 (e.g., a wireless communications medium conforming with the IEEE 802.11 standard).

Figure 7:
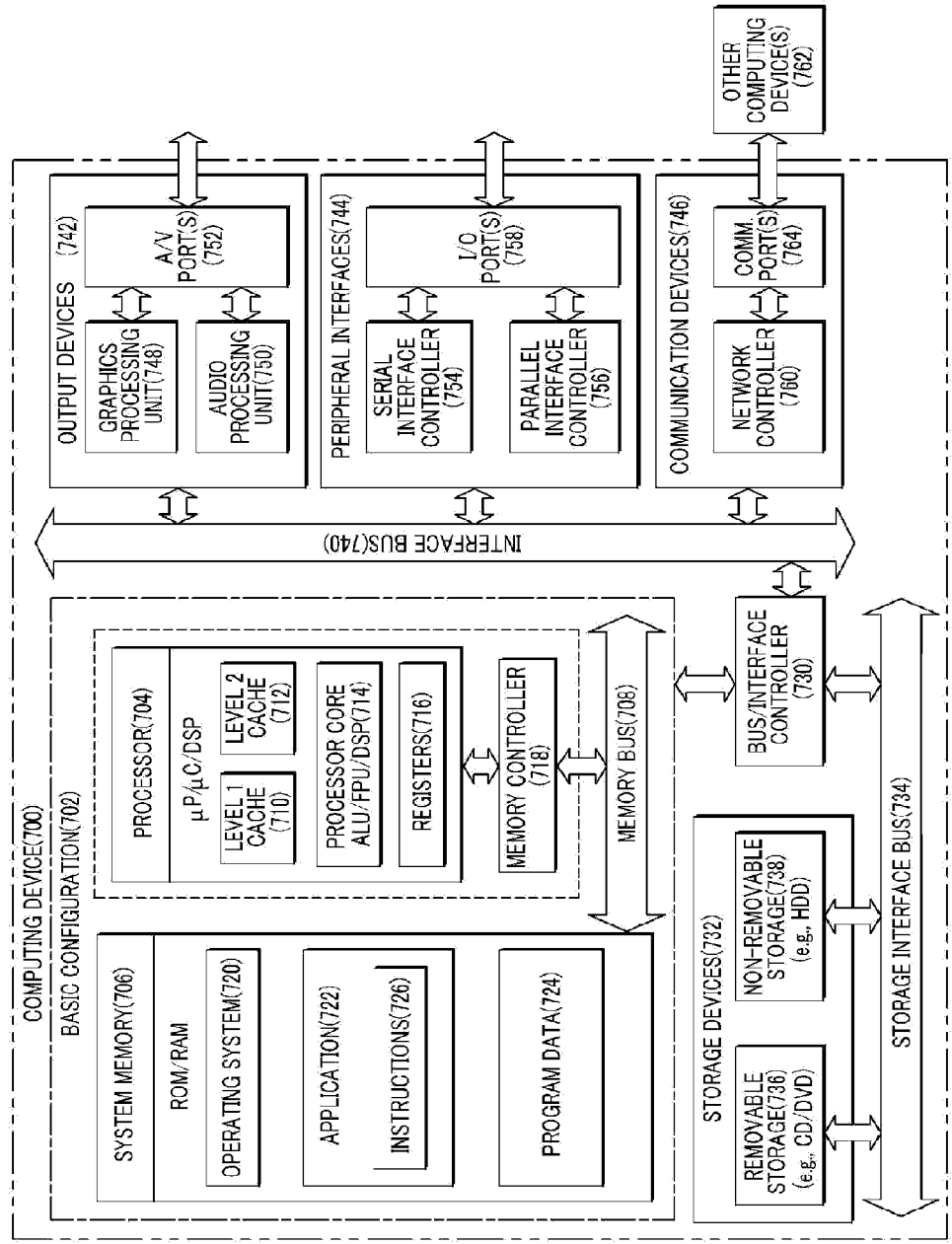
FIG. 7 is a block diagram illustrating an example computing device that may be utilized to provide a scheme for communication using handwriting input, arranged in accordance with at least some embodiments described herein.

FIG. 7 is a block diagram illustrating an example computing device that may be utilized to provide a scheme for communication using handwriting input, arranged in accordance with at least some embodiments described herein. In these examples, elements of computing device 700 may be arranged or configured for a device. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), nonvolatile memory (such as ROM, flash memory, etc.) or any combination thereof. System memory 706 may include an operating system 720, an application 722, and program data 724. Application 722 may include instructions 726 that may be arranged to perform the functions as described herein including the actions described with respect to handwriting input device 110 architecture as shown in FIG. 5 or including the actions described with respect to the flow charts shown in FIGS. 2 and 4. In some examples, application 722 may be arranged to operate with program data 724 on an operating system 720 such that the communication schemes using a handwriting input as described herein may be provided.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells.

Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a handwriting input device, comprising:
    receiving a handwritten input including a first part including a text message and a second part including an image;
    segmenting the handwritten input into the first part and the second part;
    recognizing the text message from the first part;
    compressing the second part into an image file;
    identifying a user of the handwritten input;
    determining an emotion attribute of the identified user based, at least in part, on the handwritten input;
    determining a font information regarding a font of the first part based, at least in part, on the emotion attribute, the font of the first part being selected from a plurality of fonts for the identified user; and
    generating a data file including the text message, the font information and the image file.

2. The method of claim 1, further comprising:
    transmitting the data file to a receiving device via a network.

3. The method of claim 1, wherein the determining of the emotion attribute is further based, at least in part, on at least one of contents of the text message, a size of the first part, text writing speed of the user, text writing pressure of the user, line alignment of the first part, size regularity of the first part, a number of typing errors included in the first part, an emoticon included in the first part, or a symbol included in the first part.

4. The method of claim 1, wherein the plurality of fonts for the identified user are stored in a font database.

5. The method of claim 4, wherein the font database includes a cloud data center.

6. The method of claim 1, further comprising:
    recognizing additional information including at least one of a size of the first part, a color of the first part, or a thickness of the first part, and
    wherein the data file further includes the additional information.

7. The method of claim 1, wherein the identifying of the user is based, at least in part, on at least one of the font of the first part or an identifier of the handwriting input device.

8. A method performed under control of a receiving device, comprising:
    receiving a data file including a text message of a first part of a handwritten input, a font information regarding a font of the first part, and an image file corresponding to a second part including an image included in the handwritten input, the data file being generated by a handwriting input device;
    selecting the font of the first part based, at least in part, on the font information, the font of the first part being selected from a plurality of fonts for a user of the handwriting input device; and
    generating the first part based, at least in part, on the text message and the font of the first part,
    wherein the font information is based, at least in part, on an emotion attribute of the user of the handwriting input device.

9. The method of claim 8, wherein the plurality of fonts for the user of the handwriting input device are stored in a font database.

10. The method of claim 9, wherein the font database includes a cloud data center.

11. The method of claim 8, wherein the method further comprises:
    restoring the second part based, at least in part, on the image file; and
    combining the generated first part and the restored second part.

12. The method of claim 8, wherein the data file further includes additional information including at least one of a size of the first part, a color of the first part, or thickness of the first part, and the method further comprises:
    applying the additional information to the generated first part.

13. A handwriting input device, comprising:
    a receiving unit configured to receive a handwritten input including a first part including a text message and a second part including an image;
    a text message recognition unit configured to recognize the text message from the first part;
    a user identification unit configured to identify a user of the handwritten input;
    an emotion attribute determination unit configured to determine an emotion attribute of the identified user based, at least in part, on the handwritten input;
    a font information determination unit configured to determine a font information regarding a font of the first part based, at least in part, on the emotion attribute, the font of the first part being selected from a plurality of fonts for the identified user;
    an image file compression unit configured to compress the second part into an image file; and
    a data file generation unit configured to generate a data file including the text message, the font information and the image file.

14. The device of claim 13, further comprising:
    a transmitting unit configured to transmit the data file to a receiving device via a network.

15. The device of claim 13, wherein the emotion attribute determination unit determines the emotion attribute based, at least in part, on at least one of contents of the text message, a size of the first part, text writing speed of the user, text writing pressure of the user, line alignment of the first part, size regularity of the first part, a number of typing errors included in the first part, an emoticon included in the first part, or a symbol included in the first part.

16. The device of claim 13, further comprising:
    an additional information recognition unit configured to recognize additional information including at least one of a size of the first part, a color of the first part, or thickness of the first part, and
    wherein the data file further includes the additional information.

17. The device of claim 13, wherein the user identification unit identifies the user based, at least in part, on at least one of the font of the first part, or an identifier of the handwriting input device.

18. The device of claim 13, wherein the plurality of fonts for the identified user are stored in a font database.

19. The device of claim 18, wherein the font database includes a cloud data center.

20. A non-transitory computer-readable storage medium having stored thereon computer-executable instructions that, in response to execution, cause a handwriting input device to perform operations, comprising:
- receiving a handwritten input including a first part including a text message and a second part including an image;
- segmenting the handwritten input into the first part and the second part;
- recognizing the text message from the first part;
- compressing the second part into an image file;
- identifying a user of the handwritten input;
- determining an emotion attribute of the identified user based, at least in part, on the handwritten input;
- determining a font information regarding a font of the first part based, at least in part, on the emotion attribute, the font of the first part being selected from a plurality of fonts for the identified user;
- generating a data file including the text message, the font information and the image file; and
- transmitting the data file to a receiving device via a network.

21. The computer-readable storage medium of claim 20, wherein the determining of the emotion attribute is based, at least in part, on at least one of contents of the text message, a size of the first part, text writing speed of the user, text writing pressure of the user, lane alignment of the first part, size regularity of the first part, a number of typing errors included in the first part, an emoticon included in the first part, or a symbol included in the first part.

22. A non-transitory computer-readable storage medium having stored thereon computer-executable instructions that, in response to execution, cause a receiving device to perform operations, comprising:
- receiving, from a handwriting input device, a data file including a text message of a first part included in a handwritten input, a font information regarding a font of the first part, and an image file corresponding to a second part including an image included in the handwritten input;
- determining the font from the first part based, at least in part, on the font information, the font of the first part being selected from a plurality of fonts for a user of the handwriting input device; and
- generating the first part based, at least in part, on the text message and the font of the first part,
- wherein the font information is based, at least in part, on an emotion attribute of the user of the handwriting input device.

* * * * *